United States Patent [19]

Gaehring et al.

[11] Patent Number: 4,529,609

[45] Date of Patent: Jul. 16, 1985

[54] PROCESS FOR PREPARING QUICK COOKING SEMIMOIST PASTA AND PRODUCT THEREOF

[75] Inventors: David P. Gaehring, Collingswood; Edward H. Krystek, Lindenwold; William M. Hildebolt, Mickleton, all of N.J.

[73] Assignee: Campbell Soup Company, Camden, N.J.

[21] Appl. No.: 380,143

[22] Filed: May 20, 1982

[51] Int. Cl.³ ................................................ A23L 1/16
[52] U.S. Cl. .................................... 426/532; 426/557
[58] Field of Search ................ 426/557, 451, 331, 531

[56] References Cited

U.S. PATENT DOCUMENTS

| | | | |
|---|---|---|---|
| 1,299,819 | 4/1919 | Bouchet | 426/451 |
| 1,883,653 | 10/1932 | Epstein et al. | 426/557 |
| 2,243,690 | 1/1941 | Murakami et al. | 426/557 |
| 2,677,613 | 5/1954 | Shiah | 426/451 |
| 3,138,462 | 6/1964 | Kitz et al. | 426/557 |
| 3,192,049 | 6/1965 | Kinsley | 426/557 |
| 3,252,805 | 5/1966 | Sienkiewicz et al. | 426/451 |
| 3,482,993 | 12/1969 | Fincane | 426/557 |
| 3,484,251 | 12/1969 | Lawrence et al. | 426/331 |
| 3,495,989 | 2/1970 | Lewis et al. | 426/451 |
| 3,537,862 | 2/1971 | Peters et al. | 426/451 |
| 3,615,677 | 10/1971 | Scharschmidt et al. | 426/557 |
| 3,655,401 | 4/1972 | Halik | 426/557 |
| 3,655,404 | 4/1972 | Glasser et al. | 426/331 |
| 3,732,112 | 5/1973 | Frankenfeld et al. | 426/451 |
| 3,753,734 | 8/1973 | Kaplow et al. | 426/331 |
| 3,767,421 | 10/1973 | Gulstad et al. | 426/19 |
| 3,767,422 | 10/1973 | Levitz | 426/549 |
| 3,769,034 | 10/1973 | Dreier, Jr. et al. | 426/549 |
| 3,846,563 | 11/1974 | Cuttingham | 426/557 |
| 3,914,445 | 10/1975 | Pavey | 426/326 |
| 3,916,029 | 10/1975 | Hildebolt | 426/94 |
| 4,044,165 | 8/1977 | Baumann | 426/557 |
| 4,098,906 | 7/1976 | Hisaki et al. | 426/94 |
| 4,234,689 | 1/1981 | Kokeguchi et al. | 426/557 |
| 4,243,617 | 1/1981 | Sakakibara et al. | 426/557 |
| 4,297,378 | 10/1981 | Haasl et al. | 426/557 |
| 4,368,210 | 1/1983 | Murakami et al. | 426/532 |

*Primary Examiner*—Raymond Jones
*Assistant Examiner*—Elizabeth A. King
*Attorney, Agent, or Firm*—Banner, Birch, McKie & Beckett

[57] ABSTRACT

A semimoist pasta product is prepared by uniformly dispersing a finely divided salt throughout a dough of wheat flour and water, partially gelatinizing the salt-containing dough, and then drying the gelatinized dough to a moisture content of at least 15% and an $A_w$ of no more than 0.85. The dough, which can be made from wheat flour other than conventionally employed durum semolina, may also contain preservatives and color enhancing additives. The dough is formed into a pasta shape at any appropriate point after the finely divided salt is uniformly dispersed throughout the dough. The resulting semimoist pasta product is flexible, shelf stable and quick cooking.

22 Claims, No Drawings

PROCESS FOR PREPARING QUICK COOKING SEMIMOIST PASTA AND PRODUCT THEREOF

TECHNICAL FIELD

This invention relates generally to a quick cooking semimoist pasta product and a method for its production.

BACKGROUND ART

High quality pasta products (e.g., spaghetti, marcaroni, noodles, fetucini, etc.) are generally available only in a dried uncooked state. The process of making conventional dried pasta is itself a costly process because it requires the use of expensive durum semolina wheat flour and a time consuming, critically controlled drying step. Attempts to use less expensive flours generally have resulted in lower quality pasta with less "bite" and reduced resistance to overcooking. Preparing dried and uncooked pasta for consumption requires boiling the pasta for periods from about 10 to 20 minutes. It would be advantageous, therefore, to develop a process for making a quick cooking semimoist pasta which does not require expensive durum semolina wheat flour or complicated drying procedures, but still retains the "bite" of high quality pasta. In recognition of the short comings of dried pasta products, the art has made several attempts to develop a quick cooking semimoist pasta.

U.S. Pat. No. 3,655,401 describes a method for producing a semimoist pasta product in which dry pasta is first parboiled and, after draining, cooked in a solution of polyhydric alcohol, salt, and an antimycotic, followed by surface drying. The quick cooking semimoist pasta made according to the teachings of this patent, is unacceptable in both flavor and surface texture. U.S. Pat. No. 3,495,989 discloses another method in which dry pasta is soaked in a salt solution over night, gelatinized, and then pasturized in a closed container. The quick cooking semimoist pasta produced according to the teachings of this patent clumps together after only a few days of storage and is gummy and sticky when cooked. In addition to being commercially unacceptable, the semimoist pasta products described in the above-discussed patents are made from conventional dried pasta. The additional process steps, therefore, result in a product which is more expensive than conventional dried pasta.

Limiting "water activity" ($A_w$) in intermediate moisture foods has become an important method of preventing microbial decomposition. Water activity is the measure in a system of the unbound free water available to support biological and chemical reactions. One measure of water activity is $A_w = P/P_o$, where P is the vapor pressure of water in the system (food item) and $P_o$ is the vapor pressure of pure water at the same temperature. Lowering $A_w$ restricts the growth of bacteria and is accomplished by lowering P, the vapor pressure of water in the food item. P may be depressed by including sufficient amounts of solutes in the food item. The drop in P is in accordance with Raoult's law which states that $P = x\ P_o$, where x is the mole fraction of water in the food item. Typical solutes employed in foods are sugars, salts, propylene glycol and the like.

Most bacteria of concern in food preservation require $A_w$ values of 0.90 or greater to grow. There are some halophilic bacteria that grow at $A_w$ values down to 0.75, but they seldom cause food spoilage. Molds, however, will grow at $A_w$ levels down to about 0.65 which is too low for most foods to retain an intermediate moisture content. Semimoist foods usually have $A_w$ values between 0.70 and 0.85. An antimycotic is generally included, therefore, to inhibit molds at semimoist levels. Food items employing the above principles of food preservation are described in U.S. Pat. Nos. 3,202,514, 3,655,401 and 3,914,445.

DISCLOSURE OF INVENTION

It is an object of the present invention to provide a quick cooking semimoist pasta product which does not suffer the disadvantages of the prior art semimoist and dried pasta products.

More specifically, it is an object of the present invention to provide a high quality pasta product which is quick cooking and highly acceptable to consumers.

It is also an object of this invention to provide a quick cooking semimoist pasta product which is shelf stable for at least one year.

Another object of the present invention is to provide a process for making a high quality, quick cooking semimoist pasta which does not require expensive durum semolina wheat flour.

Yet another object of the present invention is to provide a process for making a high quality pasta product which does not require time consuming or critically controlled drying steps.

A further object of the present invention is to provide a process for making a high quality, quick cooking semimoist pasta product which may be carried out with conventional pasta making equipment.

These and other objects of the invention, which will readily occur to those skilled in the art, are achieved by making a quick cooking semimoist pasta by the method comprising the steps of uniformly dispersing a finely divided salt through a dough comprised of wheat flour and water; partially gelatinizing said self-containing dough with moist heat; partially drying said partially gelatinized dough to a moisture content of no less than about 15% and an $A_w$ level of no more than about 0.85; and forming said salt-containing dough into the desired final shape at any appropriate point after said salt dispersing step.

The present invention is also directed to a quick cooking semimoist pasta product comprising a shaped, flexible, shelf stable, partially gelatinized dough with an $A_w$ level of no more than about 0.85 and a moisture content of no less than about 15%, said dough comprising a finely divided and uniformly dispersed salt, water, and a wheat flour other than durum semolina.

MODES FOR CARRYING OUT THE INVENTION

The present invention is directed to a quick cooking semimoist pasta and a process for its production. The optimum desired characteristics of both the process and the pasta product are: (1) the option of using wheat flour less expensive than durum semolina; (2) a process for making a pasta product which requires only a short, uncomplicated drying cycle; (3) a pasta product having a 50% or more reduction in reconstiution time; (4) a pasta product which is of high quality and consumer appeal; and (5) a pasta product with a long shelf life. Applicants have found that the above objects can be achieved by following the teachings of the prevent invention.

One of the primary advantages of the present invention is that it does not require the use of expensive durum semolina wheat to make a high quality pasta product. Any conventional edible grade wheat flour is suitable for use, such as cake and bread flours. A high gluten content will facilitate extrusion or sheeting the dough. The deciding factor, however, in choosing a flour is finished product color. Second clears flour, for example, will produce a pasta product with excellent texture, but it is a dark yellow-brown. Of course durum semolina may also be used in the present invention without sacrificing the other advantages such as the simplified drying and quick cooking features.

The salt plays a critical role in the successful application of the prevent invention. First, the salt allows the use of flour other than durum semolina. It interacts with the protein molecules in the dough at their polar sites modifying the teritiary structure of the proteins which results in increased flexibility. Second, the salt reduces surface tension of the water which enables more complete hydration of the protein and starch granules. Third, the salt reduces the amount of free water (i.e., lowering $A_w$) which prevents spoilage and results in long shelf stability. As used herein, the term "salt" encompasses any edible highly dissociative $A_w$-depressing solute that provides electrolytes which associate with the polar sites of the protein contained in the flour.

The salt accomplishes the above functions only when it is finely divided and uniformly dispersed throughout the dough as described below. By finely divided is generally meant that at least about 70% of the salt crystals have U.S. mesh size of about 65 or smaller. Larger salt crystals will produce weak points in the product's structure. There is no lower limit on the size of the salt particles except that at some point the finely divided salt will become too hydroscopic to handle easily. Although many edible water soluble salts are suitable to produce a pasta with the above described physical properties, sodium chloride is preferred because it produces a product with a flavor most acceptable to consumers.

Beta carotene can be added to the dough to improve product color. Low concentrations of nonfat dry milk or whole eggs may also be added in addition to or in place of beta carotene to improve product color and to reduce translucence associated with the products of nondurum semolina flours. Care should be taken, however, to keep whole egg additions to a minimum (generally less than about 2%) because high concentrations can cause the product to become gummy and the surface to become ragged. The selection and amounts of the above and other color enhancing additives are primarily asesthetic considerations and are within the skill of the art.

The final product of the present invention may reach the consumer in either a frozen, canned, or shelf stable form. If the product is to be packaged in a shelf stable form, a preservative should be included in the dough. This is desirable because low $A_w$ levels do not prevent molds and yeasts from attacking the product. Although the selection of a preservative is within the skill of the art, it has been found that potassium sorbate is particularly desirable because it maintains a good product flavor. Glycerol, however, has been found to inhibit proper blending. Concentrations of the preservative will vary with the selection and are also within the skill of the art.

In making the pasta dough from the above ingredients, it is critical to mix the flour, water and salt in the correct order. First, the flour should be mixed with sufficient water to form an extrudible dough. The specific moisture content of the extrudible dough, while within the skill of the art, is preferably about 28 to about 32%. At moisture levels above about 35%, dough is generally difficult to extrude. Once the flour is fully hydrated, the finely divided salt is then worked into the dough until it is evenly and completely dispersed. Care should be taken to avoid over working the dough during mixing. After approximately 25 minutes, the dough will become sticky and difficult to work with. The process of the present invention may be carried out in any conventional batch or continuous mixing, extruding or forming equipment known to the art, such as Demaco or Buhler-Miag mixers and extruding presses. It is preferred to use stainless steel equipment once the salt has been added to avoid corrosion.

Dispersing the finely divided salt throughout the dough modifies the soft dough balls made from flours other than durum semolina so that they closely resemble the compact uniform dough made from durum semolina. If no salt is added, the low grade flour pasta dough is not as smooth or as rubbery upon extrusion and is more sticky after the partial gelatinization step. After drying, the saltless product is very brittle and falls apart into dough balls when the product is boiled prior to consumption.

The relative amounts of salt, flour and water will vary and are somewhat interdependent. Salt will generally range from a maximum of about 8% to a minimum of about 3% by weight of the dry ingredients. Salt content above about 8% will generally result in a product that is unpalletable. The minimum amount off salt is dependent on the final moisture content of the pasta product and the desired $A_w$ level. If the salt content is too low, the moisture content of the final product will be too low to maintain flexibility at an $A_w$ level that will prevent spoilage. The exact amount of salt required to produce a product with a specific $A_w$ level and moisture content combination is within the skill of the art.

Forming the pasta into a desired final shape can be effected by any of the methods known in the art for that purpose. Two methods, however, are particulary suited to the practice of the present invention. In the first method, the self-containing dough is extruded directly into the desired final shape before the gelatinization step described below. In the second method in the dough is extruded into thin sheets which are later cut into the desired final shape. The sheets are preferably cut at either of two points in the process described below. The second method is preferred when the final product shape permits because handling is simplified in the gelatinization and drying steps. Conventional extrusion equipment is suitable, such as Demaco or Buhler-Maig single or twin screw extruders.

After the dough has been extruded into either a final shape or a sheet, it is partially gelatinized at temperatures of 160° F. or higher with moist heat to stabilize its shape. The protein in the dough will also be partially denatured (e.g., up to 50%) which aids in developing some of the elastic strength found in the product. It is critical to maintain the relative humidity in the gelatinizing environment sufficiently high to prevent drying of the pasta. If the moisture content should drop to below about 20%, the final product will be brittle and crumble easily. The preferred method of galatinizing the dough is in a continuous belt stream blancher, such as a Demaco continuous belt blancher, employing saturated steam at one atmosphere pressure. The length of the gelatinization step will depend on the thickness of the pasta and the temperature employed. The dough will only be partially gelatinized (e.g., 5–10% is sufficient) because there is insufficient water for gelatinization to go to completion. The rate of gelatinization drops off exponentially and the practical limit is reached very quickly. A representative time and temperature for a sheet dough 0.046 inches in thickness is one to two minutes in saturated steam at one atmosphere pressure (approximately 208° to 210° F.). Optimum times and temperatures will vary with each individual application, but are easily established by those skilled in the art.

When gelatinizing dough that previously has been extruded into its final shape, the individual pieces should not be allowed to touch because they will stick together. Thus handling dough in sheet form is easier. To facilitate handling after the gelatinization step, the gelatinized dough can be cooled to room temperature which removes surface moisture and slightly surface hardens the dough. After cooling, the gelatinized dough is nonsticky, elastic and durable. Sheets of dough may be cut to the desired final shape at this point.

After gelatinizing and cooling the dough, it can be dried to a final moisture content using cool or hot air drying. The end point of the drying step is reached at a moisture level high enough to maintain flexiblity, but low enough so that the $A_w$ level is sufficient to prevent spoilage. The minimum moisture content to preserve flexibility of the pasta product is about 15%, although 16% or higher is generally preferred. The maximum $A_w$ level which will insure shelf stability is about 0.85. This may correspond to a total content of up to about 30% water in some systems. In one preferred embodiment employing cake flour, approximately 6.4% sodium chloride by weight of the dry ingredients is utilized and the product is dried to a moisture content of about 25% and a $A_w$ level of about 0.85.

As a final step when drying long goods (e.g., spaghetti, sheets, etc.), the semimoist pasta should be allowed to equlibrate to prevent breakage if rough handling is expected. Equilibration involves allowing the semimoist pasta to rest in a chamber with minimal air flow at a relative humidity level approximately the same as the $A_w$ of the finished product. Water migrates from the interior of the pasta outwards towards the surface imparting uniform flexibility and durability. Equilibration can be a continuous process. The pasta can be moved through a chamber on a continuous belt or through a stick dryer so long as the humidity and air flow requirements are met. The time required for equilibration will vary depending upon the thickness of the pasta, humidity and air flow. Sufficient equilibration can be readily determined when the pasta becomes flexible and durable. As a representative example, a 0.046 inch sheet at room temperature and 85% humidity requires from about 10 to 20 minutes to equilibrate. Short goods (e.g., elbow macaroni) may be sufficiently durable to be packaged without a separate equilibration step. When the pasta is still in the shape of a sheet, it may be cut into the desired final shape after equilibration using conventional equipment, such as a Clermont noodle sheet slitter and cutter loader. Cutting the sheet at this point is preferred because simplicity in handling is maintained through completion of the drying step.

In the preferred embodiment, the semimoist pasta product is packaged in an opaque and oxygen/moisture barrier package. The product will have a shelf life of at least one year. The product may be prepared for immediate consumption by placing it in boiling water until it is fully rehydrated and a portion of the salt has migrated from the pasta to the surrounding water. While the cooking time will vary with the thickness of the pasta product, it will generally be in the range of 2 to 3 minutes.

The following Examples are intended to illustate more fully the nature of the present invention without acting as a limitation on its scope.

EXAMPLE 1

This example demonstrates the preparation of a high quality, quick cooking, semimoist pasta product utilizing a low grade wheat flour. The final product has the following formulation (all percentage are by weight):

Cake Flour: 69.0%
Pulverized NaCl: 4.8%
Potassium Sorbate: 0.2%
Beta Carotene: 0.006%
Non Fat Dry Milk: 1.0%
Water (approx.): 25.0%

In preparation of the dough product, potassium sorbate, beta carotene and the milk powder were first dispersed in sufficient water to provide an extrudable dough (30–32% water). The flour was then mixed with this dispersion in a Demaco 1000 to 3000 lb/hr mixer and extruding press. After the flour was thoroughly wetted, pulverized salt (less than 65 mesh) was metered into the mixer and mixed for about 10–15 minutes until the blend was homogeneous. The dough was then extruded in the form of a continuous sheet by a Demaco single screw extruder equipped with a dough sheet extruding die. The primary dough sheet was up to 36 inches wide and about 0.31 inches thick. The temperature did not exceed 124° F. and the extruding pressure was between 500 and 1200 psig. Two sets of mechanical sheeting rolls gave a final dough sheet 0.046 inches in thickness.

The extruded pasta sheet was then partially gelatinized by exposing it to a saturated steam environment at about 210° F. for about 2 minutes on a fryer-proof belt made by Design and Process Engineering Co. The partially gelatinized sheet was then cooled to room temperature and air dried to the end point moisture content (i.e., about 25%) in a drying cabinet equipped with low velocity air circulating blowers and heating coils. Drying required 20–40 minutes at a temperature range of 80°–120° F. At this moisture content the semimoist product had an $A_w$ of about 0.85.

The resulting product, still in sheet form, was then equilibrated in a chamber with minimal air flow at room temperature and a humidity level of about 85% for about 15 minutes. The equilibrated sheet was then cut by hand into shorter lengths and run through a noodle sheet slitter to give the pasta the shape of spaghetti.

The resulting product was shelf stable for periods of up to a year or more when packaged in an opaque and oxygen/moisture impermeable container. The final product was flexible, opaque and had an elastic and leathery appearance. During storage the partially gelatinized product remained in the semihydrated state. This relatively high moisture level, coupled with the large osmotic gradient created by the salt, caused the product to rehydrate more rapidly than traditiional dry products. Spaghetti made by the process of this invention was typically reconstituted in 2–4 minutes in boiling water while the traditional dry product takes 9–11 minutes for complete rehydration.

EXAMPLE 2

The procedure of Example 1 was repeated using the following product formulation:
Durum Semolina: 69.0%
Egg Yolks: 8.0%
Potassium Sorbate: 0.26%
Pulverized Salt: 4.4%
Water (approx.): 18.3%
The resulting product was a high quality, quick cooking semimoist pasta having the characteristics described herein.

While certain specific embodiments of the invention have been described with particularity herein, it will be recognized that various modifications thereof will occur to those skilled in the art. Therefore, the scope of the invention is to be limited solely by the scope of the appended claims.

We claim:

1. A method for making a quick cooking semimoist pasta comprising the steps of:
    (a) uniformly dispersing a finely divided salt throughout a dough comprised of wheat flour and water;
    (b) extruding said salt-containing dough into a shape selected from the group consisting of a final pasta shape and a sheet;
    (c) partially gelatinizing said extruded dough with moist heat sufficient to stabilize its shape;
    (d) partially drying said partially gelatinized dough to a minimum moisture content of about 15% and a maximum $A_w$ level of about 0.85, said salt being added in step (a) in an amount to obtain a partially dried dough of the required $A_w$; and
    (e) when said extruded dough is in the shape of a sheet, cutting said sheet into a final pasta shape after said partial gelatinization step.

2. The method of claim 1 wherein said extruding step comprises extruding said salt-containing dough directly into a final pasta shape.

3. The method of claim 1 wherein said extruding step comprises extruding said salt-containing dough into a sheet.

4. The method of claims 1, 2 or 3 wherein said salt is sodium chloride.

5. The method of claim 4 wherein said wheat flour is a wheat flour other than durum semolina wheat flour.

6. The method of claim 4 wherein said wheat flour is durum semolina wheat flour.

7. The method of claim 4 wherein said sodium chloride is added in the amount of from about 3% to about 8% by dry weight of said wheat flour.

8. The method of claim 5 wherein said dough contains a preservative.

9. The method of claim 5 wherein said dough contains one or more additives selected from the group consisting of beta carotene, whole eggs and nonfat dry milk.

10. The method of claim 5 wherein said partially gelatinized dough is dried in said partial drying step to a minimum moisture content of about 25%.

11. The method of claim 6 wherein said dough contains a preservative.

12. The method of claim 6 wherein said partially gelatinized dough is dried in said partial drying step to a minimum moisture content of about 19%.

13. The method of claim 8 wherein said preservative is postassium sorbate.

14. The method of claim 11 wherein said preservative is potassium sorbate.

15. The semimoist, partially-gelatinized pasta product produced by the method of claim 4.

16. The semimoist, partially-gelatinized pasta product produced by the method of claim 5.

17. The semimoist, partially-gelatinized pasta product produced by the method of claim 6.

18. The semimoist, partially-gelatinized pasta product produced by the method of claim 8.

19. The semimoist, partially-gelatinized pasta product produced by the method of claim 9.

20. The semimoist, partially-gelatinized pasta product produced by the method of claim 10.

21. The semimoist, partially-gelatinized pasta product produced by the method of claim 12.

22. The semimoist, partially-gelatinized pasta product produced by the method of claim 7.

* * * * *